(12) United States Patent
Castro et al.

(10) Patent No.: US 7,487,191 B2
(45) Date of Patent: Feb. 3, 2009

(54) METHOD AND SYSTEM FOR MODEL-BASED REPLICATION OF DATA

(75) Inventors: Paul C. Castro, Harrison, NY (US); Frederique A. Giraud, Ossining, NY (US); Ravindranath Konuru, Tarrytown, NY (US); Apratim Purakayastha, Yorktown Heights, NY (US); Danny L. Yeh, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 410 days.

(21) Appl. No.: 11/150,072

(22) Filed: Jun. 10, 2005

(65) Prior Publication Data

US 2006/0282482 A1 Dec. 14, 2006

(51) Int. Cl.
*G06F 17/00* (2006.01)
(52) U.S. Cl. ............. 707/204; 707/100; 707/101; 707/102; 707/10; 709/248; 709/205; 700/29
(58) Field of Classification Search ............. 707/204, 707/100, 101, 102, 10; 709/248, 205; 700/29
See application file for complete search history.

(56) References Cited

U.S. PATENT DOCUMENTS

| 6,163,856 | A  | * | 12/2000 | Dion et al. ............ 714/4 |
|---|---|---|---|---|
| 6,446,088 | B1 | * | 9/2002 | Vaduvur et al. ............ 707/201 |
| 6,728,713 | B1 | * | 4/2004 | Beach et al. ............ 707/10 |
| 6,757,896 | B1 | * | 6/2004 | Cohen et al. ............ 718/100 |
| 6,889,333 | B2 | * | 5/2005 | Lawrence et al. ............ 713/400 |
| 6,910,048 | B1 | * | 6/2005 | Misheski et al. ............ 707/103 R |
| 7,024,429 | B2 | * | 4/2006 | Ngo et al. ............ 707/201 |
| 7,054,887 | B2 | * | 5/2006 | Kozina ............ 707/104.1 |
| 7,149,759 | B2 | * | 12/2006 | Morrison ............ 707/201 |
| 7,206,805 | B1 | * | 4/2007 | McLaughlin, Jr. ............ 709/203 |
| 2004/0003086 | A1 | * | 1/2004 | Parham et al. ............ 709/226 |
| 2004/0193952 | A1 | * | 9/2004 | Narayanan et al. ............ 714/13 |

(Continued)

OTHER PUBLICATIONS

Bacon, Stephanos, "The Next Generation Data Tier: A Repository for Integration Assets", DM Review Magazine, Dec. 2004, accessed online at <http://www.dmreview.com/issues/20041201/1014502-1.html> on Mar. 3, 2008, pp. 1-4.*

(Continued)

*Primary Examiner*—Charles Rones
*Assistant Examiner*—Phuong-Thao Cao
(74) *Attorney, Agent, or Firm*—Ryan, Mason & Lewis, LLP

(57) ABSTRACT

Techniques for replicating data in a system having a data tier with a plurality of data sources and an application tier with a plurality of applications are provided. Such techniques can include creating an instance of an information model of the data that is specified by a schema. The model can be created in a form that is suitable for manipulation by at least one of the applications and that forms at least a portion of a model tier that is intermediate the data tier and the application tier. A replica of an instance of the information model can be created in a form suitable for remote transmission, and a consistency policy can be obtained that specifies a level of consistency required between the instance of the information model and the replica.

16 Claims, 10 Drawing Sheets

U.S. PATENT DOCUMENTS

| | | | |
|---|---|---|---|
| 2004/0215655 A1* | 10/2004 | Rangadass | 707/102 |
| 2004/0254937 A1* | 12/2004 | Gernold | 707/10 |
| 2005/0108298 A1* | 5/2005 | Iyengar et al. | 707/201 |
| 2006/0004923 A1* | 1/2006 | Cohen et al. | 709/228 |
| 2006/0195476 A1* | 8/2006 | Nori et al. | 707/104.1 |

OTHER PUBLICATIONS

Dreyer et al., "A Meta Model and an Infrastructure for the Non-Transparent Replication of object databases", ACM 2000, Proceedings of the Ninth International conference on Information and Knowledge Management, pp. 344-351.*

Guy et al., "Implementation of the Ficus Replicated File System," USENIX Conference Proceedings, pp. 63-71 (Jun. 1990).

Satyanarayanan, M., "Accessing Infomation on Demand at any Location—Mobil Information Access," IEEE Personal Communications, pp. 26-33 (Feb. 1996).

DB2 Sync Server, no date http://www.ibm.com/software/data/db2/everyplace/syncserver.html.

Kistler et al, "Disconnected Operation in the Coda File System", ACM Transactions on Computer Systems, vol. 10, No. 1, Feb. 1992, pp. 3-25.

"XML Schema, Tools Usage Resources Specifications and Development" downloaded on May 23, 2007 from http://www.w3.org/XML/Schema.

"XML Path Language (XPath) Version 1.0; W3C Recommendation Nov. 16, 1999"; downloaded on May 24, 2007 from http://www.w3.org/TR/xpath.

"Java SE—Java Database Connectivity (JDBC)"; downloaded on May 24, 2007 from http://java.sun.com/javase/technologies/database/index.jsp.

"JSR-000170 Content Repository for Java Technology API" (Close of Public Review: Jul. 19, 2004); downloaded on May 24, 2007 from http://www jcp org/aboutJava/community process/review/jsr170/.

"Getting Started with UML:"; downloaded on May 24, 2007 from http://www.uml.org.

"Java Message Service (JMS)"; downloaded on May 24, 2007 from http://java.sun.com/products/jms/.

\* cited by examiner

CUSTOMER (2)

```xml
<?xml version="1.0" encoding="UTF-8"?>
<xsd:schema targetNamespace="http://www.watson.ibm.com/Customer"
    xmlns:cust="http://www.watson.ibm.com/Customer"
    xmlns:xsd="http://www.w3.org/2001/XMLSchema">
  <xsd:complexType name="RootDataObject">
    <xsd:sequence>
      <xsd:element  name="customer" type="cust:Customer"
                    maxOccurs="unbounded" minOccurs="0"/>
      <xsd:element  name="contract" type="cust:Contract"
                    maxOccurs="unbounded" minOccurs="0"/>
      <xsd:element  name="claim" type="cust:Claim"
                    maxOccurs="unbounded" minOccurs="0"/>
    </xsd:sequence>
    <xsd:attribute name="uuid" type="xsd:string"/>
  </xsd:complexType>
  <xsd:complexType  name="Customer">
    <xsd:sequence>
      <xsd:element  name="customer_contract" type="cust:Contract"
                    maxOccurs="unbounded" minOccurs="0"/>
      <xsd:element  name="customer_claim" type="cust:Claim"
                    maxOccurs="unbounded" minOccurs="0"/>
      <xsd:element  name="customerid" type="xsd:string"/>
      <xsd:element  name="firstname" type="xsd:string"/>
      <xsd:element  name="lastname" type="xsd:string"/>
      <xsd:element  name="dateofbirth" type="xsd:string"/>
      <xsd:element  name="street" type="xsd:string"/>
      <xsd:element  name="city" type="xsd:string"/>
      <xsd:element  name="state">
        <xsd:simpleType>
          <xsd:restriction base="xsd:string">
            <xsd:pattern value="AL|AK|AS|AZ|AR|
                                CA|CO|CT|
                                DE|DC|
                                FM|FL|
                                GA|GU|
                                HI|
                                ID|IL|IN|IA|
                                KS|KY|
                                LA|
                                ME|MH|MD|MA|MI|MN|MS|MO|MT|MP|
                                NE|NV|NH|NJ|NM|NY|NC|ND|
                                OH|OK|OR|
                                PW|PA|PR|
                                RI|
                                SC|SD|
                                TN|TX|
                                UT|
                                VT|VI|VA|
                                WA|WV|WI|WY"/>
```

CUSTOMER (2)

```
            <xsd:restriction>
        </xsd:simpleType>
    </xsd:element>
    <xsd:element  name="postalcode">
        <xsd:simpleType>
            <xsd:restriction base="xsd:string">
                <xsd:pattern value="[0-9]{5}"/>
            </xsd:restriction>
        </xsd:simpleType>
    <xsd:element>
    <xsd:element  name="country" type="xsd.string"/>
    <xsd:element  name="telephone" type="xsd.string"/>
    <xsd:element  name="telephonetype" type="xsd.string"/>
    <xsd.element  name="bank" type="xsd.string"/>
    <xsd.element  name="bankaccountnumber" type="xsd:string"/>
    </xsd:sequence>
    <xsd:attribute name="uuid" type="xsd:string"/>
</xsd:complexType>
<xsd:complexType name="Contract">
    <xsd:sequence>
        <xsd:element  name-"contractnumber" type="xsd:string"/>
        <xsd:element  name="customerid" type="xsd:string"/>
        <xsd:element  name="type" type="xsd:string"/>
        <xsd:element  name="insuredamount" type="xsd:string"/>
        <xsd:element  name="broker" type="xsd:string"/>
        <xsd:element  name="remarks" type="xsd:string"/>
    </xsd:sequence>
    <xsd:attribute name="uuid" type="xsd:string"/>
</xsd:complexType>
<xsd:complexType name="Claim">
    <xsd:sequence>
        <xsd:element  name="claim_customer" type="cust:Customer"/>
        <xsd:element  name="claimnumber" type="xsd:string"/>
        <xsd:element  name="contractnumber" type="xsd:string"/>
        <xsd:element  name="contracttype" type="xsd:string"/>
        <xsd:element  name="customerid" type="xsd:string"/>
        <xsd:element  name="issue" type="xsd:string"/>
        <xsd:element  name="assessment" type="xsd:string"/>
        <xsd:element  name="status" type="xsd:string"/>
        <xsd:element  name="claimdate" type=xsd:string"/>
        <xsd:element  name="amountpaid" type=xsd:string"/>
        <xsd:element  name="approver" type=xsd:string"/>
    </xsd:sequence>
    <xsd:attribute name="uuid" type="xsd.string"/>
</xsd:complexType>
</xsd:schema>
```

METHOD AND SYSTEM FOR MODEL-BASED REPLICATION OF DATA

FIELD OF THE INVENTION

The present invention generally relates to data processing and, more particularly, to data replication in a distributed system using a model-based approach.

BACKGROUND OF THE INVENTION

Applications that access network-based data often rely on data replication to reduce access latency, reduce required network communications, and allow for continued operation in the event of planned or unexpected network disconnection. One simple form of replication is caching, which is suitable for read-only applications. More sophisticated mechanisms are required for applications that create, retrieve, update, and delete (often referred to as "CRUD") network-based data. Such applications may require a way to reconcile a local replica with a remote copy if they have diverged due to update operations. The replication or synchronization process can be non-trivial and require that conflicting updates be detected and resolved.

There are certain known techniques for replication that are tailored to specific data formats. However, applications are increasingly tasked with operating in conjunction with multiple data sources, which may have heterogeneous formats. One approach to dealing with heterogeneous data sources is the so-called "federated data base" approach wherein the collection of heterogeneous data sources is aggregated to appear as a single logical data store. Such work, however, is primarily focused on preserving the atomicity, consistency, isolation, and durability (often referred to as "ACID") properties of data bases rather than the managing of replicas. Distributed file systems have approached the problem by distributing replicas of the data, per se, in the form of files. However, higher level representations of data may be necessary in order for the efficient storage, organization, and retrieval of such data.

Accordingly, there is a need for an alternative mechanism to support the replication of data when dealing with heterogeneous data stores.

SUMMARY OF THE INVENTION

Principles of the present invention provide techniques for replicating data in a system, which, in an exemplary embodiment, can have a data tier with a plurality of data sources and an application tier with a plurality of applications. The exemplary method includes the step of creating an instance of an information model, creating a replica of the instance, and obtaining a consistency policy. The instance of the information model of the data can be specified by a schema, and the model can be created in a form that is suitable for manipulation by at least one of the applications of the application tier, and can form at least a portion of a model tier that is intermediate the data tier and the application tier. The replica of the instance of the information model can be created in a form that is suitable for remote transmission. The consistency policy can specify a level of consistency that is required between the instance of the information model and the replica. The schema can specify the information model via application-level requirements and can describe at least property-level content and structure to be conveyed by the model.

An exemplary method for replicating data, according to another aspect of the present invention, can include the steps of obtaining an application request, on a first computer; forwarding the request to a local model tier via a local virtual store; generating a request via the local model tier; and obtaining a replica of the customer model instance from a remote computer. In the step of obtaining the application request, the request can reference a customer model instance on the remote computer. In the forwarding step, the forwarding can be performed via a local virtual store. In the generating step, the request can be generated by means of the local model tier, in a format suitable for transmition to a remote model tier of the remote computer. The replica of the customer model instance obtained from the remote computer can be in the form of a model conveying at least property-level content and structure that is formatted to facilitate application of a consistency policy declaring a level of consistency required between the replica and the model instance.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 10A and 10B show an exemplary schema, in XSD format, which can be used to specify a model according to aspects of the present invention.

DETAILED DESCRIPTION OF PREFERRED EMBODIMENTS

Figure 1:
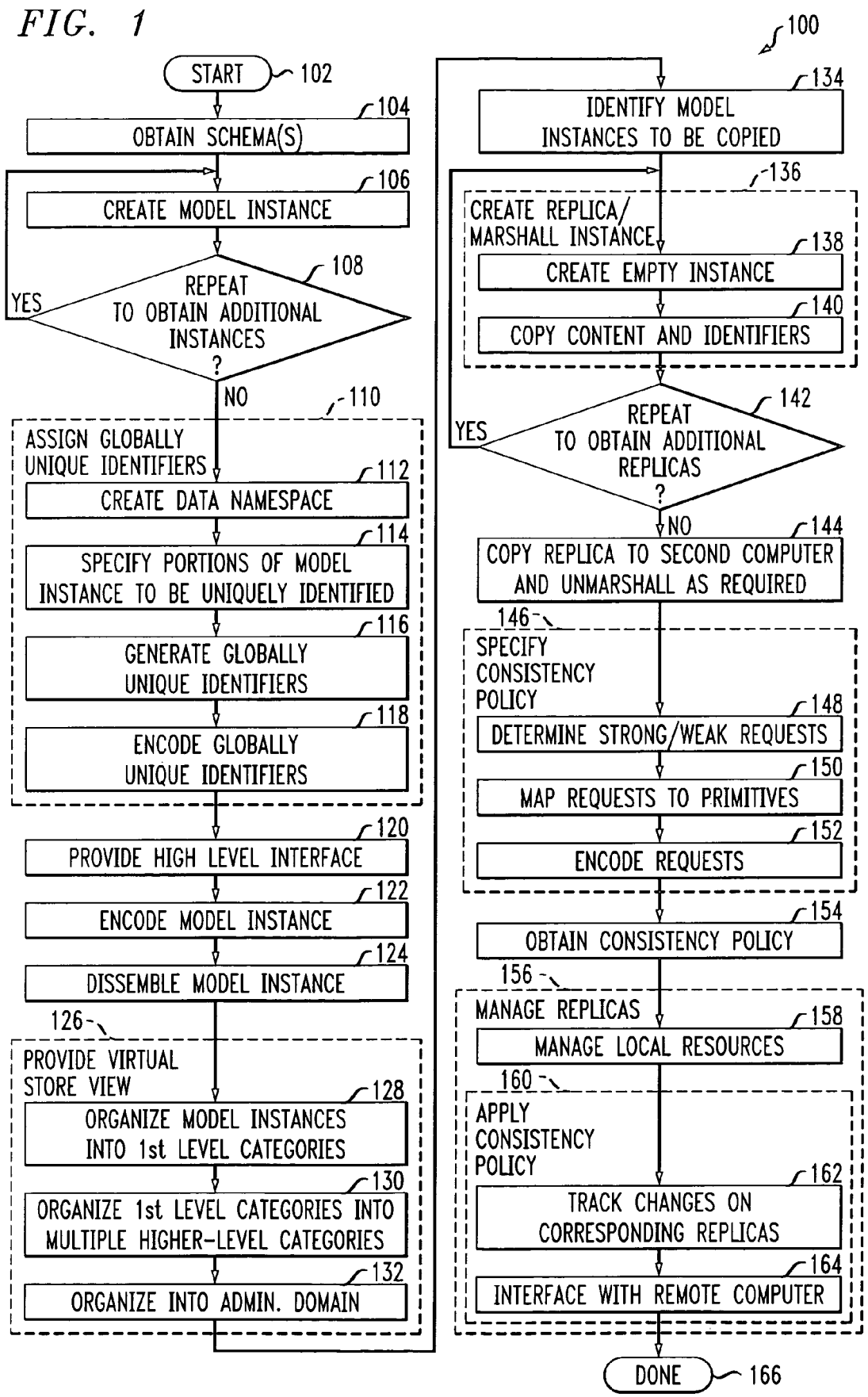
FIG. 1 is a flow chart depicting method steps of an exemplary method for replicating data in accordance with one aspect of the present invention.

Reference should now be had to FIG. 1, which depicts a flow chart 100 illustrative of an exemplary method in accordance with one aspect of the present invention. The method permits replication of data in a system that has a data tier with a plurality of data sources and an application tier with a plurality of applications. The method can include the steps of creating an instance of an information model, as per block 106; creating a replica of the instance as per block 136; and obtaining a consistency policy as per block 154. The instance of the information model of the data can be specified by a schema, and the model can be created in a form that is suitable for manipulation by at least one of the applications of the application tier. The model also can form at least a portion of a model tier that is intermediate the data tier and the application tier. Further, the replica of the instance of the information model can be created in a form that is suitable for remote transmission, and when necessary or desired, can be stored in persistent storage. The consistency policy can specify a level of consistency that is required between the instance of the information model and the replica.

The exemplary method illustrated in FIG. 1 can include one or more of a number of additional optional steps. Thus, after starting at block 102, one can obtain the schema as per block 104. The schema can specify the information model using application-level requirements, and can describe at least property-level content and structure that are to be conveyed by the model. Furthermore, where desired, the schema can describe constraints on the content that is to be conveyed by the model. As indicated in the flow chart, the step 106 of creating the model instance can be repeated, via decision block 108, where it is desired to obtain additional instances, thus resulting in a plurality of model instances. If it is not desired to obtain additional instances, or if all desired additional instances have been obtained, one proceeds to block 110 wherein one can assign to the model instance globally unique identifiers that are specified by at least one of the applications. The identifiers can pertain to at least one of property-level content and structure of the model to be described by the schema. Note that the model instances can, where desired, be created using utilities that are provided for the applications to create the instances. Further, model instances can, where desired, be assembled from data that is retrieved from one or more of the data sources. Finally, where desired or required (for example, by one or more of the applications), one or more model instances can be stored in long-term storage.

In some aspects of the invention, the step of assigning the globally unique identifiers 110 can be broken down into a number of sub-steps. For example, the assigning of the globally unique identifiers can include creating a data namespace as per block 112. The namespace can be based at least in part on the schema and the location of the data for which the schema specifies the information model. Further, the assigning step can include sub-step 114, wherein portions of the model instance to be uniquely identified are specified, and sub-step 116, wherein the globally unique identifiers are generated, based on the data namespace, for the specified portions that are to be uniquely identified. Yet further, the assigning step can include the sub-step, per block 118, of encoding the globally unique identifiers into the model instance in a manner to be accessible to at least one of: (i) system-level processes, and (ii) at least one of the applications.

Following the assignment of the identifiers at block 110, one can provide a high-level interface in a form for at least some of the applications to specify storage requirements to persistent storage, as per block 120. Further, one can encode a desired instance of a desired model in a format that is suitable for storage, as per block 122, and one can dissemble the model instance into data that is suitable for storage across at least 2 of the data sources, as per block 124.

Turning to block 126, one can provide a virtual store view abstraction of the plurality of model instances. In the abstraction, the model instances can be logically grouped together in sets, and the virtual store view abstraction can be configured such that at least some of the applications can perform CRUD operations thereon. In one approach, the virtual store view abstraction can be configured to permit access by means of model instance retrieval, operation on the model instance, and model instance storage commitment. Other approaches are possible. For example, in another approach, the virtual store view abstraction can be configured to permit access via model and operation specification and store acknowledgment.

In one or more embodiments of the invention, the step of providing the virtual store view abstraction can include one or more sub-steps. For example, the step of providing the virtual store view can include the sub-step of organizing the model instances into first level categories, based at least in part on the property-level content and structure, as per block 128. Further, the step of providing the virtual store view can include the sub-step of organizing the first level categories into multiple higher level categories based on requirements of at least some of the applications, as per block 130. Yet further, an additional sub-step of organizing the multiple higher level categories into a single administrative domain for management purposes can also be included, as per block 132.

A further possible additional step includes identifying model instances to be copied, at block 134. This can be followed by the step of creating the replica 136, which can, in turn, include the sub-steps of creating an empty instance of a model having the same schema type as the instance of the information model, at block 138, and copying at least the property-level content and applicable ones of the globally unique identifiers from the instance of the information model to the empty instance, at block 140, to form the replica of the instance. The step of creating the replica at block 136 can include marshaling the model instance into the form that is suitable for the remote transition. The model can be created on a first computer. Where desired, as indicated at block 142, the creation steps can be repeated to obtain additional desired replicas. If no additional replicas are required, or if desired replicas have been obtained, the flow can then proceed to block 144, wherein the replica can be copied to a second computer. The model instance can then be unmarshalled at the second computer from the form in which it was placed for remote transmission. Note that in the repetition initiated by block 142, one or more of the replicas can originate from different data sources.

As indicated at block 146, one can specify the desired consistency policy, for example, as an application-independent consistency policy. In one or more embodiments of the invention, the step of specifying the consistency policy can include one or more sub-steps. For example, the sub-steps can include determining whether one of strong consistency requirements and weak consistency requirements apply for a given one of the model instances, at block 148, to obtain relevant consistency requirements. A further sub-step can include mapping the relevant consistency requirements to consistency primitives, at block 150. Yet a further sub-step can include encoding the relevant consistency requirements into a policy file, as per block 152. Note that in the encoding step, one can encode at a high level and the system can generate the primitives. Alternatively, one could encode the primitives to which the relevant consistency requirements were mapped in block 150. As noted, in block 154 one can obtain a consistency policy, such as, for example, one that may have been previously specified using the techniques just discussed.

It will be appreciated that one or more of the replicas obtained in blocks 136, 142 can be managed as per block 156, for example, on a first computer. In one or more embodiments of the invention, the managing of the replicas can include one or more sub-steps. For example, per block 158, one can manage local resources that are associated with the first computer to temporarily and/or persistently store at least some of the replicas. Further, as per block 160, one can apply the consistency policy to maintain desired consistency between the replicas and corresponding ones of the plurality of model instances. Where desired or required, one can also specify one or more model replicas that are to be stored locally. The step 160 of applying the consistency policy can, in one or more embodiments of the invention, itself include one or more sub-steps. For example, a sub-step 162 can include tracking changes made on replicas that correspond to a given one of the model instances. Further, sub-step 164 can include interfacing with at least one computer that is remote from the first computer. Such interfacing can be carried out to perform one or more of the following activities: (i) information exchange pertaining to at least one of the model instances, (ii) resolution of conflicting updates pertaining to at least one of the model instances, and (iii) making a given one of the replicas consistent with a corresponding one of the plurality of model instances. One or more exemplary embodiments of the present invention are believed to be advantageous in the context of such interfacing, as higher level policies can be employed because of the use of models that may in turn specify one or more of behavior and constraints. This is in contrast to other techniques where mere data is replicated.

As indicated at block 166, a passage through the flow diagram is complete. Again, it should be noted that any one or more of the optional steps may or may not be included in a particular embodiment, and that variations in the order of performing one or more of the steps are contemplated.

Figure 2:
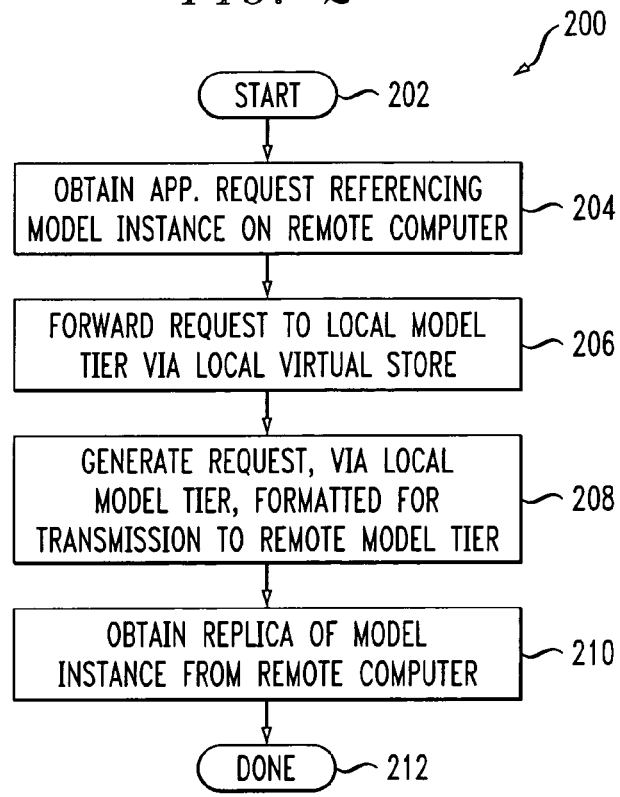
FIG. 2 is a flow chart depicting an exemplary method for replicating data in accordance with another aspect of the present invention.

Attention should now be directed to FIG. 2, which shows a flow chart 200 depicting exemplary method steps for replicating data in accordance with another aspect of the present invention. The start is indicated at block 202. One step, at block 204, includes obtaining, on a first computer, an application request that references a model instance (such as, by way of example and not limitation, a customer model instance) on a remote computer. In another step, at block 206, the request is forwarded to a local model tier via a local virtual store. At block 208, a request can be generated, using the local model tier, in a format that is suitable for transmission to a remote model tier of the remote computer. At block 210, one can obtain a replica of the model instance from the remote computer. The replica can be in the form of a model that conveys at least property-level content and structure, and the model can be formatted to facilitate application of a consistency policy that declares a level of consistency that is required between the replica and the model instance. It will be appreciated that using aspects of the present invention, for example, as illustrated in FIG. 2, one can replicate code, that is, a model such as that generated by a schema, rather than mere data or a web page.

Figure 3:
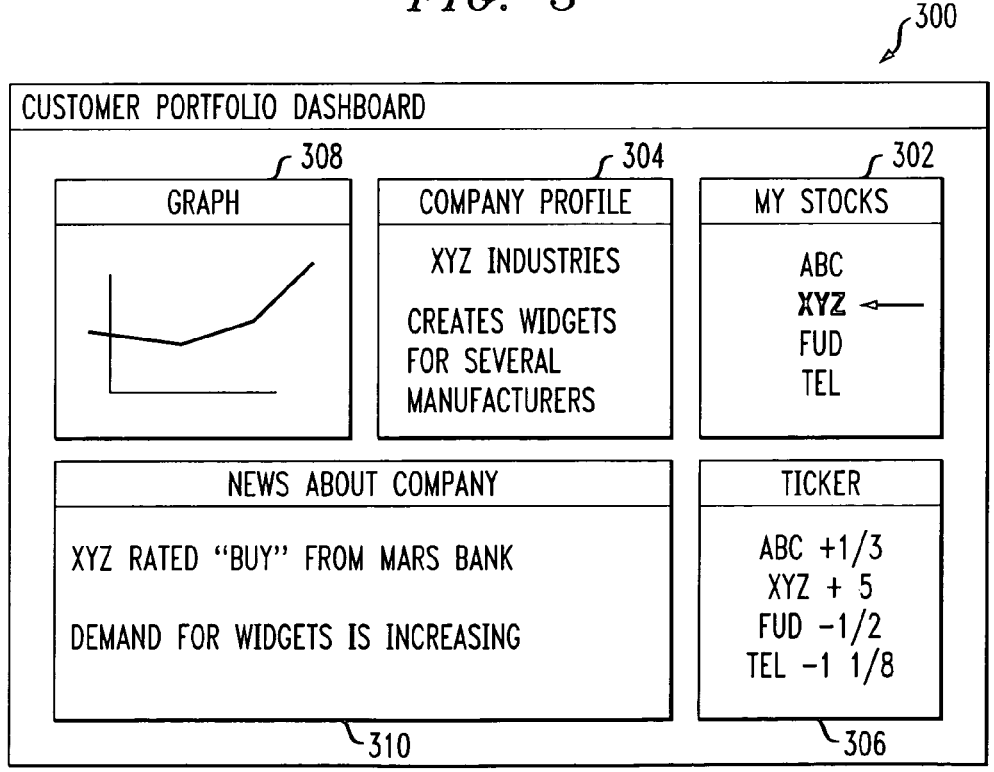
FIG. 3 depicts an exemplary financial services dashboard which is representative of one type of application that can benefit from the principles of the present invention.

FIG. 3 provides an illustrative example of a financial services dashboard, exemplary of one possible application with which the present invention can be employed It should be understood, however, that the invention is not limited to use in this application alone, and is generally applicable to any application that can benefit from distribution of model-based information. IBM Workplace Client Technology (WCT) is a Java-based platform for building and deploying enterprise applications that provides the rich user experience of stand-alone applications with the manageability and low total cost of ownership (TCO) of server-based applications. While the WCT provides sophisticated mechanisms for building and managing network-centric applications, application developers may not have a high-degree of support for managing distributed, heterogeneous data. For example, consider the "financial" dashboard application 300 implemented on the WCl and providing visual access to a customer's portfolio. In addition, for example, to providing information about a list of the customer's accounts 302, the application can retrieve profiles of a company for a given stock as shown at 304, and can provide one or more of a stock ticker 306 that shows continuously updated prices of the customer's stocks, a graph viewer 308 that shows a particular stock's historical performance, and a viewer 310 that aggregates Really Simple Syndication (RSS) news feeds from various financial websites (RSS is a well-known standard for sharing web content such as, e.g., headlines). Each of these data types can be organized into individual portlet applications (modular, independent applications that can be aggregated with other portlets to form a complete application). Additional portlets can exist though which the customer can place orders, chat with a broker, and perform other interactions that affect the portfolio (though these are not shown in FIG. 3).

The application can be powered by backend data sources that are distributed around a network. Static information about companies can be retrieved from a relational database, while more dynamic data like the stock ticker can rely on asynchronous messaging from a Java Message Service (JMS) source (the JMS application program interface (API) is a well-known messaging standard maintained by Sun Microsystems). In one version of the application, each portlet can be constructed independently of the others and the client can simply be responsible for visually aggregating the views in a meaningful way. Each view might have to build its own "data stack" to retrieve data, manage how data should be updated, and manage data persistence, and might have to be mindful of client limitations on resources such as memory, network connections, and the like. In a resource constrained environment, the application might somehow have to prioritize the level of support each application should receive. This might require the construction of an orchestrator that could monitor each of the modules and balance their requirements against the available application resources. Such an approach might not address other issues for application development—for example, the application might require a disconnected mode of operation. Each portlet can be tied to a specific backend source. These data sources may implement replication and data consistency mechanisms for their own data types. Replication of data may require the replication of each data source both locally and then in a managed fashion.

Figure 4:
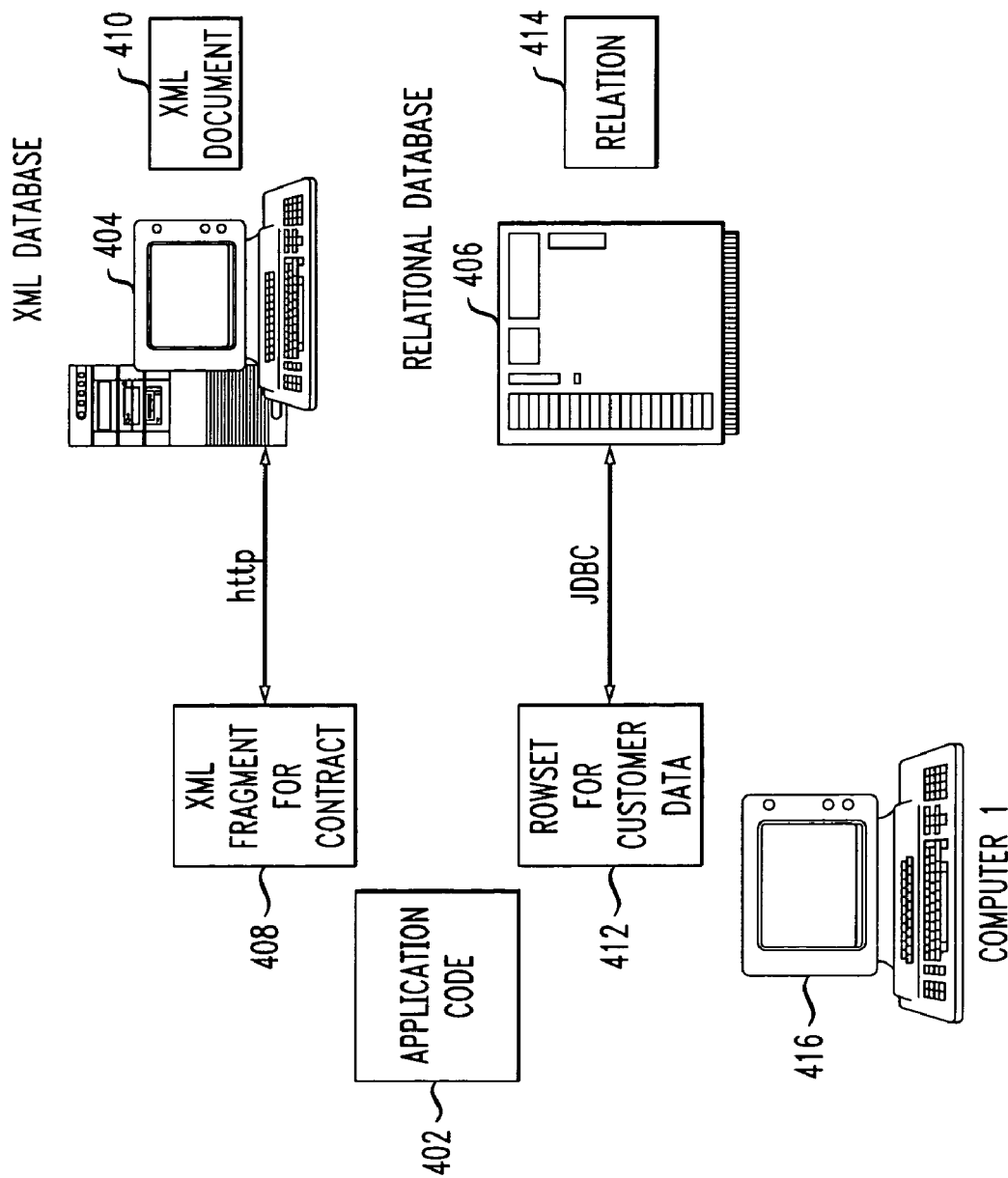
FIG. 4 depicts replication and distribution of data using store-level semantics as opposed to a model-based approach.

Aspects of the foregoing issues are depicted in FIG. 4. A single application 402 executing on a first computer 416 accesses data from both an extensible markup language (XML) database 404 and a relational database (RDB) 406. The connection to the XML database can use hypertext transfer protocol (HTTP) communications, while the connection to the relational database may require a Java Database Connectivity (JDBC) connection (the Sun Microsystems JDBC API is well-known technology). Such connections are not typically compatible with one another so the application would likely manage them separately. Once the application 402 retrieves the data, it must re-interpret the data into its implicit information model. The XML database 404 returns data in the form of an XML fragment 408, which is logically a fragment of a larger XML document 410 in the XML database 404. The RDB 414 returns a rowset object 412 that represents the result set from a relational table 414 in the database 406. For each type of data, the application must: 1) understand the structure; 2) navigate the structure to retrieve the desired content; and 3) use the content as part of its implicit model of what the data represents. The complexity of this process is expected to go up as the number of allowable data source types increases. It may even be more difficult if the data source is an aggregator of information where the underlying structure of the store is not explicit. For example, if the application accesses data from a web service it may receive that data in the form of proprietary messages.

The foregoing may have a significant impact on replication. If the application requires disconnected operation, it may need to locally store data from the set of data sources it normally uses. For the exemplary situation depicted in FIG. 4, this would require the local storage and management of a rowset and an XML document. Any consistency mechanisms would have to be built by hand; otherwise, the application would have to rely on store-specific consistency mechanisms that would likely have differing semantics and protocols.

Figure 5:
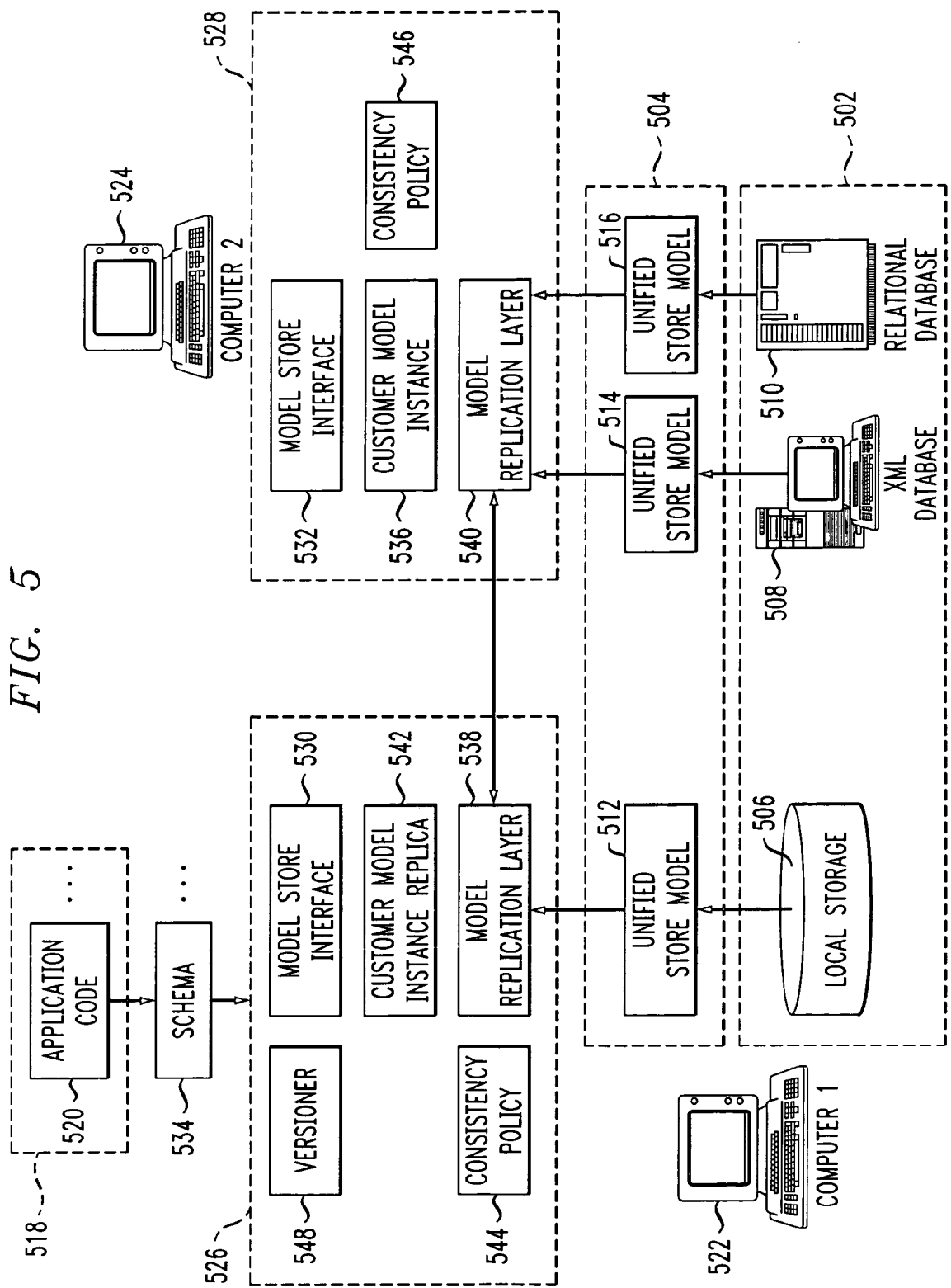
FIG. 5 shows an exemplary system employing techniques of the present invention.

One or more embodiments of the present invention offer an alternative for constructing the financial services dashboard. An application is constructed using three tiers that transform data. FIG. 5 depicts model-based replication and distribution of data. A data tier is formed, for example, by a store layer 502 and an aggregation layer 504. In store layer 502, a plurality of data items can exist on repositories 506, 508, 510 that have heterogeneous, proprietary interfaces. Internal representation of data is store-specific; for example, the store layer could contain relational database 510, XML store 508, Lightweight Directory Access Protocol (LDAP) directories, web services, etc. Note that LDAP is a well-known set of protocols for accessing, e.g., information directories. The aggregation layer can provide, through an agreed upon standard, a unified store model interface 512, 514, 516 for data which applications can use. One possible way to implement the aggregation layer is via the Java Community Process Standard JSR 000170, entitled "Content Repository for Java Technology API." At this level, all data can be viewed using an elementary content model (for example, object hierarchies) and data access can be provided through an application programming interface (API). Transactional support across individual data sources can also be provided.

An application tier 518 can be formed by one or more applications 520 running on one or more computers 522, 524. In a model tier 526, 528, data can be viewed as high-level models that can be application/language independent and/or self-describing (as opposed to the store-specific models of the store layer or the canonical, but usually elementary, model of the aggregation layer). Applications can perform CRUD operations on these high-level data models. One or more exemplary embodiments of the invention can provide a framework and infrastructure to support the creation, replication, and distribution of self-describing models for applications. The model tier 526, 528 can exploit aspects of models such as their structure and constraints, to better organize, retrieve, and store data. This allows applications a uniform model-based view on data over which they can specify one or more of distribution, access and consistency policies that are independent of the underlying store.

Applications can access data using single- and/or dual-store patterns. The model tier can provide a virtual store interface 530, 532 to applications to effect an extensible interface to access model instances. In one exemplary abstraction, applications can retrieve model instances and directly manipulate them as model objects. This dual-store model can use the following access pattern: 1) retrieve model instance, 2) perform operations on model instance, 3) commit data back to store. This process is simple to use but potentially defers validation and model consistency checks until the commit step. However; the client application can always implement model validation steps before committing to the changes to the store. Also, an application can use a combination of the single- and dual-level store approaches where the decision is partially based on performance requirements and the need for direct access to model implementations.

Another exemplary abstraction allows applications to manipulate data through a single-level interface. In this approach, the virtual store exposes the operations that applications are allowed to perform on the model instances. The access pattern would then be as follows: 1) specify model and operation to store, 2) receive acknowledgment from store. One potential advantage of this approach is that the application can be unaware of the actual implementation of the model instance. Instead, efficient representations can be used "under the covers" that allow the efficient implementation of application operations. For example, the model tier can store model instances in a compact binary format and index this format to reduce data access latency. The application may not need to be aware of this optimization and may view the data as if it were stored using actual model objects defined, e.g., in a schema 534.

A customer model instance 536 can exist on a second computer 524. Application 520 running on first computer 522 can make a request that references the customer model instance 536. This request is directed against the local virtual store using the provided interface 530. The local virtual store forwards the request to the local model tier (replication layer 538). The local model tier generates the proper request to the model tier (replication layer 540) on the second computer 524. The model tier on the second computer 524 creates a replica of the customer model instance and sends the replica 542 to the first computer 522. The first computer 522 can "store" the replica (or some efficient representation of the replica) and use it to serve the data access request from the application. Subsequent application requests that reference the customer model instance can now be served by the local customer replica. Because the data replica is a model, the model tier and/or virtual store can inspect the model to enforce schema-defined constraints on the structure and/or content of the model. This local validation of the model instance helps to reduce the needed communication between the first computer 522 and the second computer 524.

The local replica and the customer model on the second computer 524 must be kept consistent with each other. The application can provide a consistency policy 540 to the model tier. This policy can declare the level of consistency required for the local customer replica. For example, a policy could state that the customer information be synchronized with the copy of the second computer 524 once per day. It may additionally state that if the customer's address changes, then the local model should be updated immediately. The customer model may include the current geographic location of the customer using a Global Positioning System (GPS)-enabled device. The second computer 524 receives the updates to the location. The consistency policy may state that the local model on the first computer 522 should be updated if the customer moves from between county lines.

Consistency policies may be declared for both cacheable and non-cacheable data. For example, relatively static information like the customer's address can be cached and updated fairly infrequently. Reconciling the local replica with the remote replica can be accomplished using a synchronization protocol explicitly called by the model tier. Non-cacheable data on the other hand is relatively dynamic and must typically be updated fairly frequently. Synchronization protocols may have too much overhead and it is believed desirable that asynchronous update protocols be supported. In our example, a consistency policy 546 located on the second computer 524 can require the model tier to forward position changes to the first computer 522 in the form of update messages. The first computer 522 receives these messages and processes the update to its local replica. The application may require the model tier to maintain different versions of the replica. This could be the case if the application frequently edited customer information and needed a convenient way to reference older versions. For example, a web browser with forms often needs the ability to navigate forward and backward over different versions of application state during a workflow process. A versioner 548 can handle the tagging and storing of version information so the application can access these. Applications can view the model tier as a virtual store through the model store interface; using the virtual store, applications can have the ability to store multiple instances of different models and access these through a query language.

Figure 6:
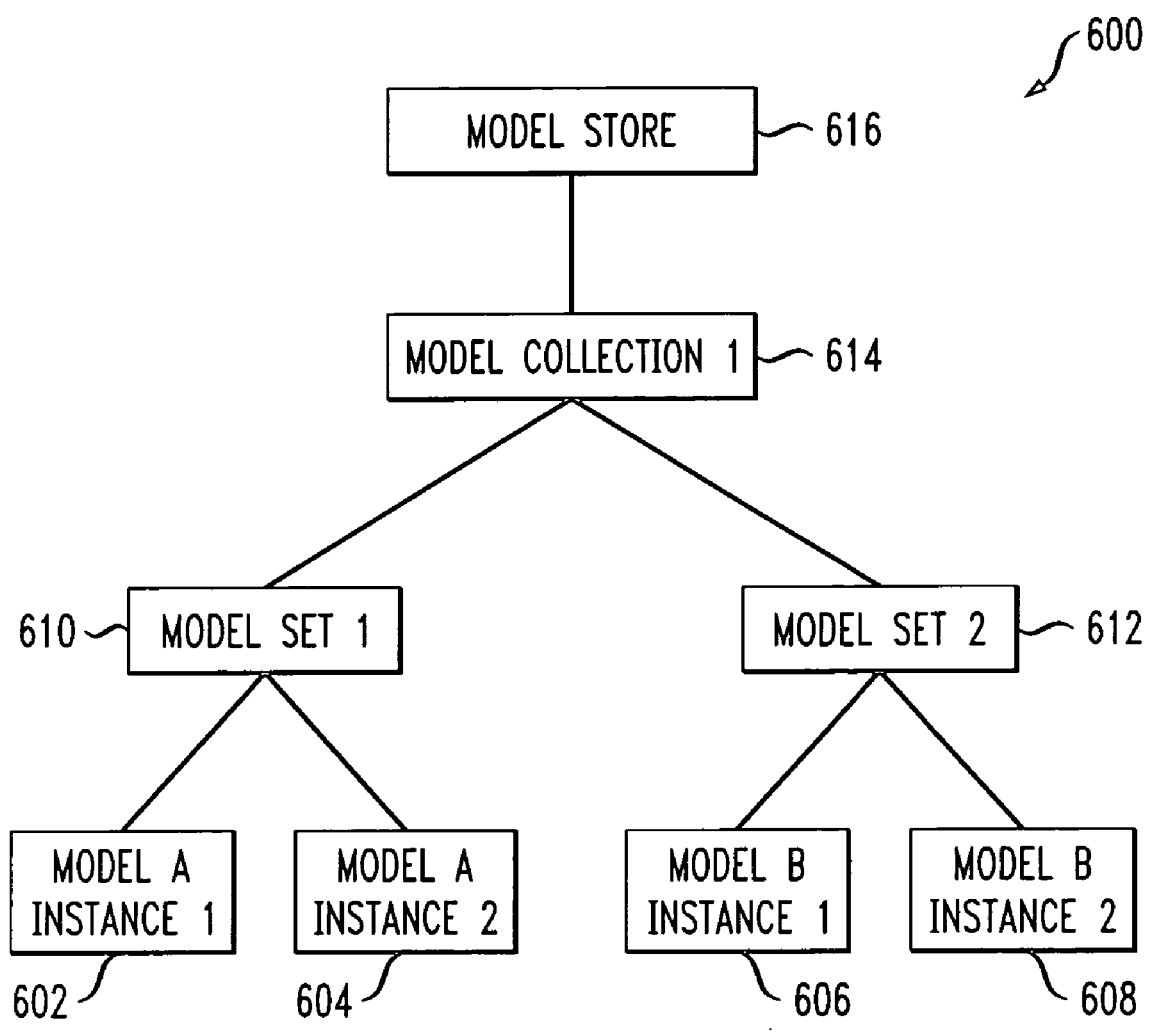
FIG. 6 shows an exemplary organization of model instances into sets, collections, and stores.

FIG. 6 depicts one possible logical organization 600 of the model store as viewed by an application. There are two model schemas A and B. Each model has 2 instances 602, 604, 606, 608. The store groups model instances by type into model sets 610, 612. Model sets in turn are grouped into a model collection 614, 616, which is the highest logical abstraction. The root of the grouping, the model store, is an administrative entity which can manage the creation and deletion of model collections.

Using a query interface provided by the model store, the application can access individual model instances, groups of model instances, and groups of groups of model instances. In some cases it may be appropriate to specify operations over model sets to achieve the flexibility of traditional database systems. For example, one may have a model set that contains all of a company's customers and one might like to project out from that set another set containing just the customers who have a mailing address in New York.

The organization of models into sets can extend beyond the confines of a single model store. For example, all model stores may be mapped to physical computer devices. Each computer device can be mapped, e.g., to a Uniform Resource Identifier (URI) using standard techniques such as domain names in the Domain Name System (DNS). This URI can correspond to a network address of the model store. Model stores can use their URI to create keys for all model instances, model sets, and model collections. Keys provide a convenient way through which to access the different elements of a model store. The key for a particular model instance could be the concatenation of the following:

URI+CollectionName+SetName+Token where URI is the uniform resource identifier representing the model store, CollectionName is the name of the collection storing the model instance, SetName is the name of the mode set containing the model instance, and finally Token is a system-generated symbol that is used to distinguish individual model instances in a set. For example the token could be created using a monotonically increasing integer generator. One might create a globally unique ID for each part of the model instance as well.

Note that in the following, the URIs are exemplary and not intended to refer to actual URIs. In the financial services application, customer record A located on a model store with URI http://www.modelstore.org could have the key:

http://www.modelstore.org/FinancialServiceApplication/ Custo merRecords/CustomerA Using keys, applications can send requests for data to the local model store. This model store can resolve the location of the data just from the namespace of the key by reconciling the URI with a network address. The model store can then form a request for the model instance based on the remainder of the key to the model store that matches the network address. The model store might also provide an extension to this naming scheme such that applications can uniquely identify the model instance they require without resorting to keys. One example of this would be attribute-based query languages such as XML Path Language (XPath) as specified by the World Wide Web consortium (W3C) where applications can specify a set of model instances that have certain attribute values in their content (e.g. all customers where address state="NY").

Figure 7:
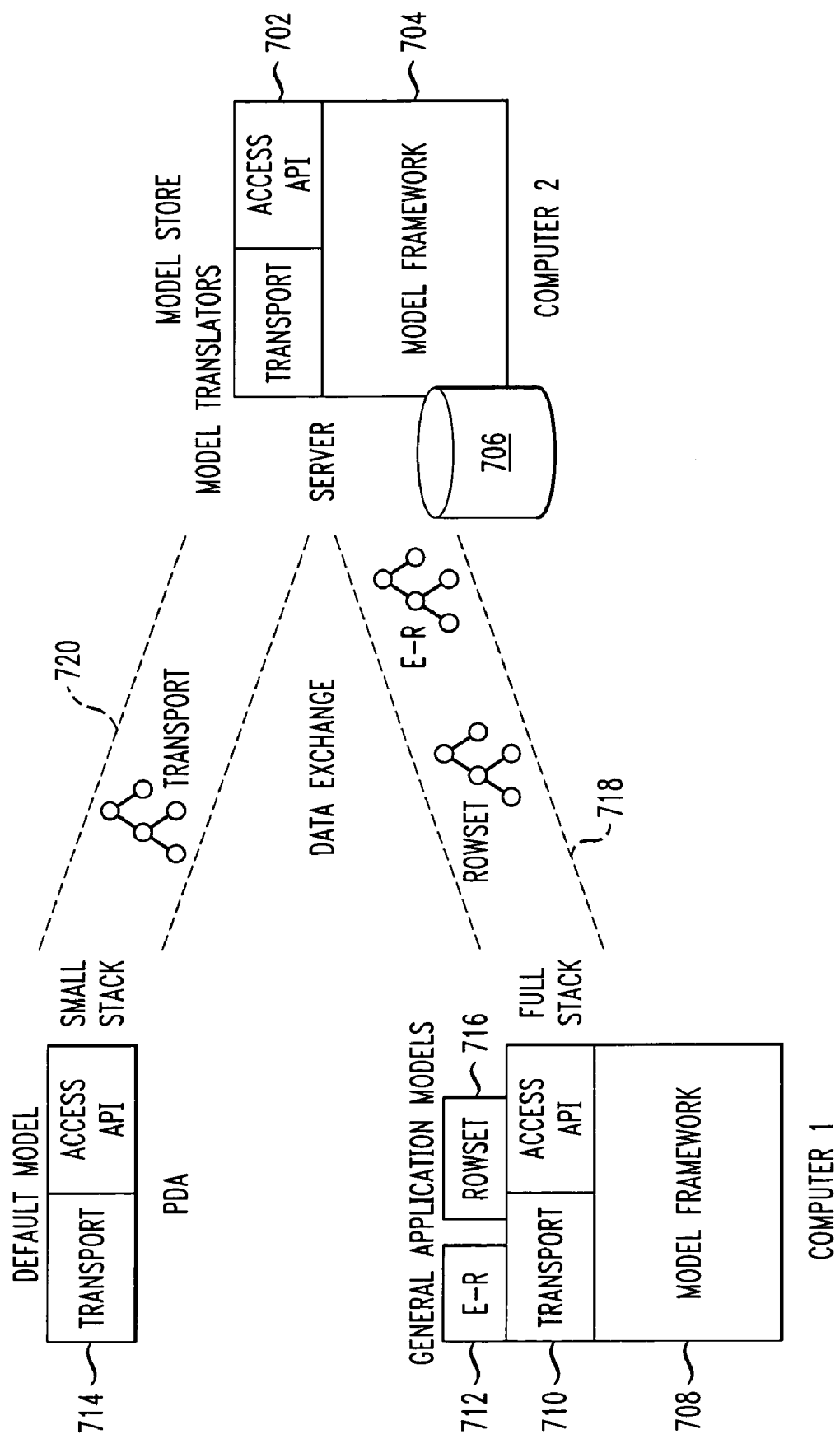
FIG. 7 depicts an exemplary method by which a model tier in accordance with an aspect of the present invention can transport model instances over a network.

FIG. 7 illustrates an example of how the model tier can be deployed on different devices to exchange model instances. For example, there can be three possible model tier "stacks," each specialized for devices with varying capabilities. The first stack, formed by common access API/transport component 702 and model framework 704, can be specialized for devices that are not resource constrained such as, but not limited to, large workstations and mainframe computers and have access to large persistent stores 706. The second stack, formed by element 712, common access API/transport component 710 and model framework 708, can be designed for capable client machines such as, but not limited to, desktop computers and laptops. The third stack, formed by common access API/transport component 714, can be designed for highly constrained devices such as, but not limited to, Personal Digital Assistants (PDAs), cellphones, and embedded sensors.

Each stack can have the aforementioned common access API and transport component 702, 710, 714. One possible purpose of the transport component is to provide a common access interface that all applications can use to access to manipulate model instances, regardless of the model schema. The transport component can convert high-level models into an elementary content model that provides basic access to model content, structure, and constraints. One possible purpose of the elementary content model is to act as a data transfer object between model stacks. For example, an Entity-Relationship (ER) model instance 712 and a Rowset model instance 716 exist on the first computer. To exchange data with the server, the first computer can create one or more communications channels 718 to exchange control messages and data. The high-level ER and Rowset model instances can be transformed into data transfer objects defined by the elementary content model and shipped to the server. The server can have a similar transport component that can unpack the data transfer objects and re-constitute their content into the high-level ER and Rowset model instances. In the same manner, the server can create instances of ER and Rowset models based on raw data in its persistent store 706. These model instances can be packed into data transfer objects and shipped to the PDA using one or more communication channels 720. Although not pictured in FIG. 7, both the PDA and the first computer may also have some form of persistent storage, which they can use to store model instances.

The elementary content model used to form the data transfer object can itself be a simple model. Resource constrained devices can take advantage of this by providing only facilities to perform CRUD operations on this single model type, thereby avoiding the cost of the full model framework 704, 708 available on less resource constrained devices. The exemplary devices can exchange high-level models, with two devices using the access interface provided by the ER and Rowset models, and one device using the access interface provided by the common access API and transport component.

It is presently believed that there are at least three options for interfacing the model store and external persistent stores such as databases and file systems: fully materialized, materialize on-demand, and un-materialized. In the fully-materialized option, the model store essentially maintains an actual mirror of all data derived from the backend persistent stores, but in the form of models. The fully materialized option may be the simplest from the logical point of view but may also be less efficient in space and computation. The materialize on-demand option would only materialize those model sets that one expected to use; this is potentially more efficient than the fully materialized option. The most efficient option may potentially be an un-materialized model store, where no real model sets are mirrored, but, rather are produced on-the-fly in response to external requests.

Figure 8:
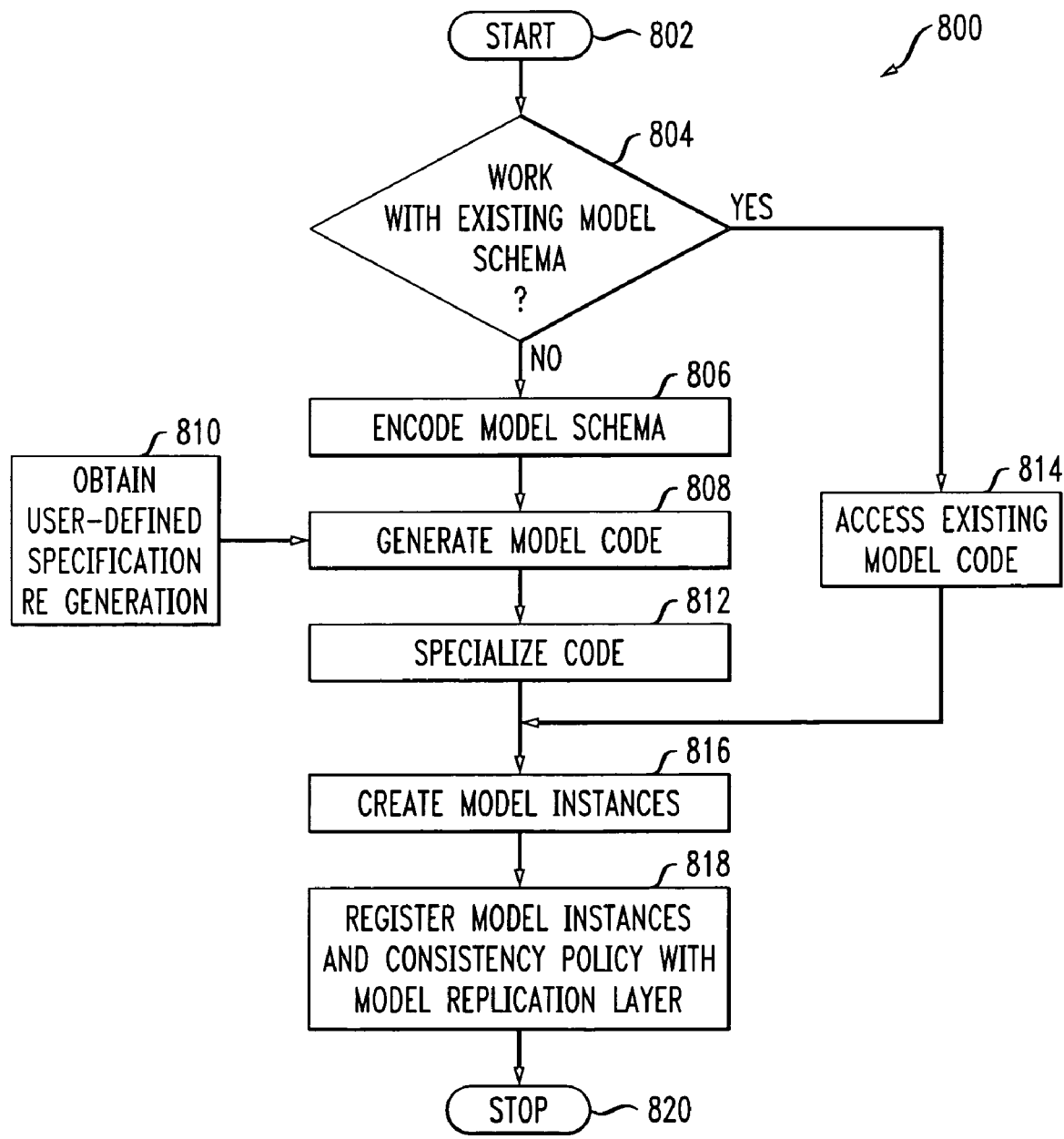
FIG. 8 is a flow chart depicting exemplary method steps that can be performed, for example, by an application using models in accordance with aspects of the present invention.

Referring now to FIG. 8, a flowchart 800 illustrates exemplary steps an application developer can perform to create and register a model instance with one or more exemplary embodiments of the invention. After starting at block 802, the application developer must determine whether to create model instances of an already existing schema or create a new model schema, as per block 804. If the decision is to create a new schema, then the methodology proceeds to step 806 where the application developer can specify a model schema in a machine readable format. There exist several ways to do this. For example, certain database systems define schema modeling languages through which database administrators can design database schemas within the constraints of the database design. A more general approach exists in various machine-readable markup languages such as the Unified Modeling Language (UML) specified by the Object Management Group (OMG) and the XSD (XML schema definition language discussed below with respect to FIGS. 10A and 10B. Using these markup languages, it is possible to create descriptions of information models that can be parsed by available tools such as those available from IBM Rational products.

After encoding the model, the methodology proceeds to step 808, which generates model code that is compatible with the model tier layer. This step can produce various styles of model code, dependent on the construction method of the application; for example, source code can be generated that can be packaged and included into an application developer's codebase. In, e.g., an object-oriented environment, the model code generator can be configured to produce object code that implements well understood interfaces in order to be usable by the model object tier. Tools that can generate source code from model descriptions include, e.g., the Eclipse Modeling Framework (EMF) available from the Eclipse Project. Step 808 can make use of a user-defined specification regarding model code generation, as shown at block 810.

After generating model code, the methodology proceeds to step 812, where the application developer can specialize the generated model code and can add an alternative interface to interact with model instances. For example, the model schema may define rowsets and produce basic model code for rowsets. The application developer can then add an interface that allows the manipulation of the rowsets through a high-level query language like Structured Query Language (SQL). This type of interface can be specific to the model schema and may not be created automatically.

If the application developer chooses to use an existing model in step 804, then the methodology proceeds to step 814, where the application developer chooses an existing model (it is assumed that some other developer or process has produced model code and optionally specialized it as in step 812 or that the same developer has done this earlier). These existing models can exist in a library that is accessible to the application developer or packaged as part of a development tool. After step 812 or step 814, the methodology proceeds to step 816, where the application developer creates instances of the model. This can be done, for example, using the common access API presented in FIG. 7, and/or via a specialized interface created in step 812.

To allow the replication and distribution of models, the application developer should register the model schema and model instances with the model replication layer/model store as per stop 818. In the registration process, the application developer can provide: 1) the model schema, 2) the model instances, 3) a specification for the organization of models into model sets, collections etc., and 4) the consistency policy for the model instances. Optionally, the application developer can also provide security information such as an access control list. The application developer can also specify other non-functional requirements, such as the required storage space, to the model replication layer.

After the registration process, the application developer can allow application code to use the model schema and instances through the virtual store abstraction. Application code can perform CRUD operations on the model instances—this application code does not have to be co-located with the model store that initially stores the model instances. As described above with respect to FIGS. 5 and 6, the application code can be located on a remote node and can access the model instances through another model store. The model replication tier can make the model instances available to the application regardless of location, transparently replicating model instances as required by the application's consistency and performance requirements. The application need not be aware of this distribution or replication. Block 820 indicates a stop point after a pass through the process.

In view of the foregoing description of the flow chart 800 of FIG. 8, it will be appreciated that one or more embodiments of the present invention can include steps such as creating a schema by encoding symbols representative of the schema into a machine-readable format and generating model-tier compatible model code from the machine-readable format of the schema. Such code can be generated in a form to facilitate creation of an instance of an information model of the kind described above. Furthermore, one or more additional schemas can be accessed in heterogeneous machine-readable formats for generation of model-tier compatible code for the creation of instances of additional information models. One or more of these can be, for example, the previously-created model schemas referred to in discussion of block 814. One or more of the steps depicted in FIG. 8 can be repeated to result in the generation of model code for additional information models. When generating model code as per block 808, as noted, one can obtain a user-defined specification that specifies generation of the code as per block 810. Code can then be generated according to such specification, in a form to ensure compliance of instances of a given once of the information models with a corresponding one of the schemas. It should be noted that, with respect to the flow chart of FIG. 8, as well as other flow charts in the figures, and the corresponding discussions thereof in the accompanying text, one or more steps may be depicted or discussed as occurring in a certain order. However, such steps may possibly be performed in one or more different orders without departing from the scope or spirit of the present invention.

Figure 9:
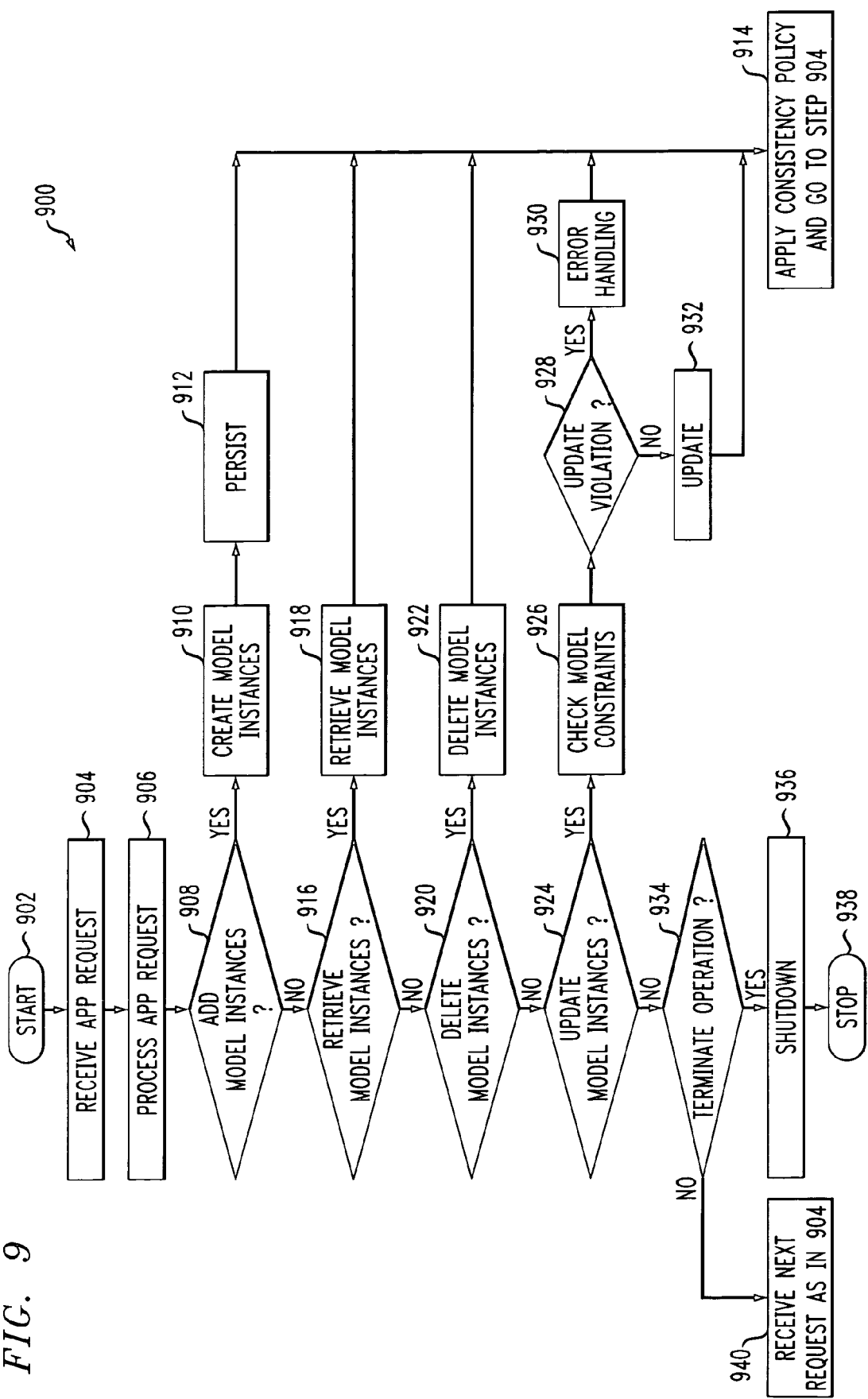
FIG. 9 is a flow chart describing steps that can be performed by an exemplary embodiment of a model replication layer acting as a model instance store.

Referring now to FIG. 9, a flowchart 900 illustrates exemplary steps performed by one or more embodiments of the invention to process application-initiated operations over model instances. After starting at block 902, the model replication layer, at block 904, receives an application request to perform a CRUD operation on a model instance. An application may be configured to specify more operations and functions than those depicted. Application requests can originate locally (to the model replicate layer) or arrive from remote model stores that are forwarding remote application requests. After receiving the request, the methodology proceeds to step 906, where the request is initially processed. Here the model store can keep track of the identity of the originator of the request as well as any other state information necessary to fully process the request and return the results. It is also here that the model store can determine to what subset of model instances the operation or operations should be applied to. The illustrative application request contains only a single operation, for clarity; ready extension to the case where an application request contains multiple operations is possible.

After the initial processing of the request, the methodology can determine the type of operation that must be performed. In step 908, if the operation is to add a model instance, then the model store retrieves the necessary data from the application request and creates a model instance in step 910. The methodology proceeds to step 912 where it optionally persists this model instance to a backend store that organizes model instances as specified by the application. The methodology proceeds to step 914 where it checks the consistency policy for model instances. The consistency policies may require the model store to send update messages to remote model stores that are storing replicas on which this new model instance has an impact (e.g. the replica represents a customer in New York, and another model store has replicated a model set that should contain all customers in New York). The consistency policy may also trigger updates to replicas that have set conditions on whether or not they should be updated. Afterwards, the methodology waits for new application requests.

If the application request is to retrieve model instances as in step 916 then the methodology proceeds to step 918 and retrieves the model instances. In a materialized store, this is fairly straightforward as the model instances already exist. In a partially materialized store, some of the desired model instances may exist in a cache while other model instances may have to be created from raw data in some persistent store. In both these cases the model tier may have to connect to one or more backend data sources to retrieve the content needed to assemble the model instances. The required model instances are then be packaged into data transfer objects and returned to the requesting application (e.g., through a remote model store in the case of a forwarded request). The methodology then proceeds to step 914 where it waits for new application requests. It is possible that some consistency policies will trigger messages when an application retrieves model instances, e.g. if an application sets up a counter that counts the number of times a model instance is read.

If the application request is to delete model instances as in step 920 then the methodology proceeds to step 922 where the model store deletes model instances. Like the step of retrieving model instances, the model store may have to communicate with one or more backend stores to delete the raw content used to construct the model instances. The methodology then proceeds to step 914 where consistency policies are applied.

If the application request is to update model instances as in step 924 then the methodology proceeds to step 926 where the model store checks the constraints defined by the model instances to see if the update is allowable. In step 928, if an update violates a model constraint, then the model store can perform some error handling, which may involve generating messages back to the application that informs the application of what took place. After error handling step 930, the methodology proceeds to step 914, where the model store awaits new application requests. If the updates do not violate any constraints in step 928, then the methodology proceeds to step 932, where the model store applies the updates to the model instances. This may be done in a reversible manner—any update applied now may have to be rolled back based on the consistency policy of the model instances. For example, applications on different mobile devices may have several levels of priorities over model instances. One application is always allowed to make updates while other application can only make permanent updates if they do not conflict with the highest priority application. In this case, most updates will be pending until the highest priority application acknowledges that the model instance can be made permanent in its present form.

If the application request is to terminate the execution of the model tier as in step 934, the methodology proceeds to step 936 and 938 and shuts down the model store. Otherwise, if the request is not covered by any of these cases, the model store can ignore it and wait for new application requests as in step 940. The model store can perform additional operations not defined in the flowchart such as creating new versions of model instances, compressing model instances, and the like, but these are omitted for clarity. It will be appreciated that the method steps depicted in FIG. 9 represent one possible manner in which replicas can be managed, as at block 156 of FIG. 1, discussed above.

Attention should now be given to FIGS. 10A and 10B, which depict an example schema in Extensible Mark Up Language Schema Definition Language (known as XML Schema Definition Language and sometimes referred to as XML Schema or XSD). From the schema depicted in FIGS. 10A and 10B, source code representing instances of the model described by the schema can be generated either manually or using one or more model generation tools. Other types of coding can be used for the schema, for example, the aforementioned Uniform Modeling Language (UML).

It will be appreciated that one or more exemplary embodiments of the present invention can serve to provide a high level of abstraction over which applications can share and exchange data. Such applications may have implicit models of data that are internal to the source code. Furthermore, one or more exemplary embodiments of the present invention may simplify application development by handling common replication, distribution and consistency functions. Still further, one or more embodiments of the present invention may offer the advantage of allowing specialized content models for each application fitting the specific requirements of that particular application. Yet further, it will be appreciated that in one or more embodiments, the present invention can enable efficient use to be made of available resources while imposing minimal overhead, and may be configured to support multiple consistency models.

In certain aspects of the present invention, data may be encapsulated in a self describing model in the form of data plus meta-data that conveys one or more of content, structure and constraints. Specification of constraints may be advantageous. Distribution of models as opposed to raw, untyped data may provide, in one or more embodiments of the present invention, one or more of the following advantages: permitting applications to rely on serialization mechanisms for modeling tools, easing the management of replicas, and the masking out of lower-level models from consistency requirements where desired. Further, models in accordance with the present invention can, where appropriate, be constructed in a structured manner so that they can be queried using structured query languages. Thus, an infrastructure can be provided allowing applications to use distributed data based on application-defined models. One can store, organize and/or query instances of heterogeneous models created by applications.

One or more embodiments of the present invention can provide a default interface to applications allowing models from different applications to be queried over common elements that both share. Such an interface could be, for example, in the form of an object graph query language such as the XPath language. In such case, models from several applications can be viewed primarily as collections of objects and references. Both structured and unstructured searches can be provided for.

Yet further, one or more embodiments of the present invention can allow applications to logically organize collections of model instances so that they can be retrieved easily. Further, applications may be permitted to access all data as if it were local to the application. One or more embodiments of the invention may be provided to handle non-functional requirements imposed on applications that use models but where low programming effort and low data access latency are still required. Since certain models may be expressed in a more verbose manner than raw data, in some applications, higher memory requirements may be encountered at run time.

The invention can take the form of an entirely hardware embodiment, an entirely software embodiment, or an embodiment containing both hardware and software elements. In one preferred embodiment, the invention is implemented in software, which includes but is not limited to firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The medium can be an electronic, magnetic, optical, electromagnetic, infrared or semi-conductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and digital video disk (DVD).

A data processing system suitable for storing and/or executing program code will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Software solutions may employ a single piece of software or multiple pieces of software. For example, the exemplary method illustrated in FIG. 1 could include a single piece of software, or could include a basic software program with a number of software tools called or associated with the program. Such tools could execute, for example, steps 110, 126, 136, 146, 156. Software can also operate in conjunction with human input, for example, as described with regard to FIG. 8. The above-described computer components may exist on one or more elements illustrated in the figures herein, by way of example and not limitation, elements 404, 406, 416, 506, 508, 510, 522, 524, and 706. Thus, it will be appreciated that the computer systems and servers described herein can each contain a memory that will configure associated processors to implement the methods, steps and functions disclosed herein. The memories can be distributed or local and the processors can be distributed or singular. The memories can be implemented as electrical, magnetic, or optical memories, or any combination of these or other types of storage devices. Furthermore, the term "memory" should be construed broadly enough to encompass any information able to be read from or written to an address in the addressable space accessed by an associated processor. Within this definition, information on a network is still within a memory because the associated processor can retrieve the information from the network. The aforementioned computer readable or computer usable medium can include not only the described recordable media, but can also be a transmission medium, such as a network comprising fiber-optics, the world-wide web, cables, or a wireless channel using time-division multiple access, code-division multiple access, or other radio-frequency channel. Any medium known or developed that can store information suitable for use with a computer system may be used. The computer-readable code means can be any mechanism for allowing a computer to read instructions and data, such as magnetic variations on a magnetic media or height variations on the surface of a compact disk such as one of the described optical disks.

It will be further appreciated that the term "processor" as used herein encompasses any processing device, such as, for example, one that includes a central processing unit (CPU) or other forms of processing circuitry. Further, the term "processor" may refer to more than one individual processor.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer implemented method for replicating data in a system having a data tier with a plurality of data sources and an application tier with a plurality of applications, said method comprising the steps of:

creating an instance of an information model of the data specified by a schema, said model instance being created in a form suitable for manipulation by at least one of the applications of the application tier and forming at least a portion of a model tier intermediate the data tier and the application tier, said model tier comprising a virtual store interface through which said at least one of the applications accesses said instances;

creating a replica of said instance of said information model in a form suitable for remote transmission; and obtaining a consistency policy that specifies a level of consistency required between said instance of said information model and said replica;

wherein said data tier comprises:

a store layer comprising said plurality of data sources; and an aggregation layer intermediate said store layer and said model tier, said aggregation layer comprising a plurality of unified store model interfaces corresponding to respective ones of said plurality of data sources;

wherein said store layer comprises a plurality of store-specific information models;

wherein said aggregation layer comprises an elementary information model: and wherein said model tier comprises a self-describing high-level information model.

2. The method of claim 1, further comprising the additional step of obtaining said schema, said schema specifying said information model via application-level requirements, said schema describing at least property-level content and structure to be conveyed by said model.

3. The method of claim 2, wherein said schema further describes constraints on said content to be conveyed by said model.

4. The method of claim 2, wherein said instance of said information model is created on a fast computer, said method further comprising the additional steps of:

copying said replica to at least a second computer; and identifying said model instance as a model instance that is to be copied;

and wherein:

said step of creating said replica comprises marshalling said model instance into said form suitable for said remote transmission; and said step of copying said replica comprises un-marshalling said model instance, at said second computer, from said form suitable for said remote transmission.

5. The method of claim 2, further comprising the additional steps of:

repeating said step of creating an instance in order to obtain a plurality of model instances; and providing a virtual store view abstraction of said plurality of said model instances wherein said model instances are logically grouped together in sets, said virtual store view abstraction being configured to allow at least some of the applications to perform create, retrieve, update and delete operations thereon.

6. The method of claim 5, wherein said virtual store view abstraction is configured to permit access via model instance retrieval, operation on said model instance, and model instance storage commitment.

7. The method of claim 5, wherein said virtual store view abstraction is configured to permit access via model and operation specification and store acknowledgement.

8. The method of claim 5, wherein said step of providing said virtual store view abstraction in turn comprises:

organizing said model instances into first level categories based at least in part on said property-level content and structure;

organizing said first level categories into multiple higher level categories based on requirements of at least some of the applications; and organizing said multiple higher level categories into a single administrative domain for management purposes.

9. The method of claim 5, further comprising the additional steps of:

repeating said step of creating a replica in order to obtain a plurality of replicas, at least some of said replicas originating from different ones of the data sources; and managing at least some of said replicas on a first computer.

10. The method of claim 9, wherein said managing step in turn comprises:

managing local resources associated with said first computer to perform at least one of temporarily and persistently storing at least some of said replicas; and applying said consistency policy to maintain desired consistency between said replicas and corresponding ones of said plurality of model instances;

said method further comprising the additional step of specifying said consistency policy as an application-independent consistency policy, said step of specifying said consistency policy in turn comprising:

determining whether one of strong consistency requirements and weak consistency requirements apply for a given one of said model instances, to obtain relevant consistency requirements;

mapping said relevant consistency requirements to consistency primitives; and encoding said relevant consistency requirements into a policy file;

wherein said step of applying said consistency policy in turn comprises:

tracking changes made on those of said replicas corresponding to a given one of said model instances; and interfacing with at least one computer remote from said first computer to perform at least one of: (i) information exchange pertaining to at least one of said model instances, (ii) resolution of conflicting updates pertaining to at least one of said model instances, and (iii) making a given one of said replicas consistent with a corresponding one of said plurality of model instances.

11. The method of claim 2, further comprising the additional steps of:

creating said schema by encoding symbols representative of said schema into a machine-readable format;

generating model-tier compatible model code from said machine-readable format of said schema, said model code being generated in a form to facilitate creation of said instance of said information model; and accessing a plurality of additional schemas, in heterogeneous machine-readable formats, for generation of model-tier compatible code for creation of instances of additional information models.

12. The method of claim 11, further comprising the additional step of repeating said step of generating said model code for said additional information models; wherein said step of generating said code, for a given one of said information models, comprises:

obtaining a user-defined specification specifying generation of said code; and generating said code according to said specification, said code being generated in a form to ensure compliance of instances of said given one of said information models with a corresponding one of said schemas.

13. The method of claim 2, further comprising the additional step of assigning to said model instance globally unique identifier's specified by at least one of the applications, said identifiers pertaining to at least one of said property-level content and structure of said model described by said schema.

14. The method of claim 13, wherein said assigning step in turn comprises:

creating a data namespace based at least in part on: (i) said schema and (ii) location of said data for which said schema specifies said information model thereof;

specifying portions of said model instance to be uniquely identified;

generating said globally unique identifiers, based on said data namespace, for said portions; and encoding said globally unique identifiers into said model instance in a manner to be accessible to at least one of (i) system-level processes, and (ii) at least one of the applications.

15. The method of claim 13, wherein said step of creating said replica in turn comprises:
creating an empty instance of a model having a same schema type as said instance of said information model;
copying at least said property-level content and applicable ones of said globally unique identifiers from said instance of said information model to said empty instance to form said replica of said instance.

16. The method of claim 2, further comprising the additional steps of
providing a high-level interface in a form for at least some of the applications to specify storage requirements to persistent storage;
encoding said instance of said model in a format suitable for storage; and
dissembling said instance of said model into data suitable for storage across at least two of the data sources.

* * * * *